July 9, 1957  P. DE LA BRÈTEQUE  2,798,845
METHOD OF PURIFYING ALKALI ALUMINATE LYE
Filed June 11, 1956  2 Sheets-Sheet 1

INVENTOR.
PIERRE DE LA BRÈTEQUE
BY
Morrison, Kennedy & Campbell
ATTORNEYS

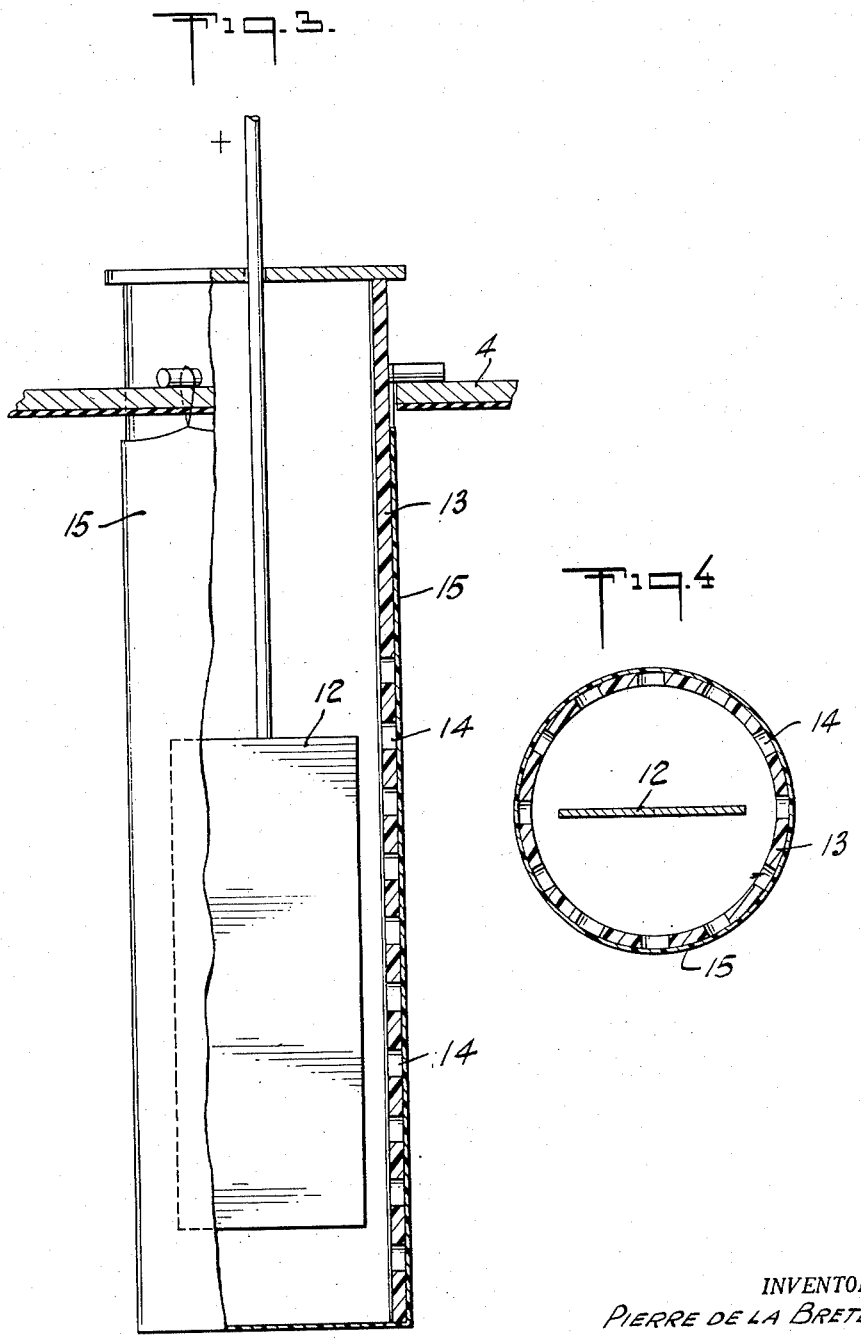

United States Patent Office 2,798,845
Patented July 9, 1957

2,798,845

METHOD OF PURIFYING ALKALI ALUMINATE LYE

Pierre de la Bretèque, Marseille-St. Louis, France, assignor to Société Anonyme pour l'Industrie de l'Aluminium, Chippis, Switzerland, a joint-stock company of Switzerland Application June 11, 1956, Serial No. 590,502

Claims priority, application Switzerland June 13, 1955

12 Claims. (Cl. 204—130)

The present invention relates to a method of purifying a solution of alkali aluminate with simultaneous recovery of metallic gallium and vanadium compounds.

The alkali aluminate solutions, particularly the sodium aluminate lyes such as are obtained during the recovery of alumina from aluminum ores according to the well known processes of Bayer, Pedersen, etc., contain generally as impurities compounds of iron, silicon, gallium, vanadium, chromium and other elements, as well as occasionally organic substances.

During the carrying out of the Bayer process especially, the aluminate lyes obtained by dissolving bauxite in caustic soda become after dilution freed from the insoluble residues (red mud) by decantation, filtering or in other ways. The clarified lye obtained contains gallium as sodium gallate and vanadium as sodium vanadate, silicon as sodium silicate and iron as more or less complex compounds. The clarified aluminate lye further contains organic substances. Generally, the greatest part of iron contained in the clarified aluminate lye goes over into the alumina during the precipitation of the alumina (decomposition), whereas the compounds of silicon, gallium and vanadium as well as the organic substances remain for the greatest part in the aluminate lye. However, the concentration of sodium silicate is such, that the silica in the hydrate of alumina represents an impurity of the same order of magnitude as the iron compounds. As a result, the iron and silicon compounds are the main ones which hinder the recovery of a very pure alumina, according to the processes in which aluminate lyes are used.

Up to now, it has been tried without success to purify the clarified aluminate lyes before decomposition, that is before precipitation of the hydrate of alumina.

There is known a process of purifying by fractionate precipitation. In accordance with this process, one precipitates before all a part of the hydrate of alumina (first fraction), separates the lye from the precipitate and carries out a new composition of the lye (second fraction). With the second fraction, one obtains an alumina which has a much lower content of ferric oxide than that of the hydrate of alumina of the first fraction.

My present invention allows the purifying of alkali aluminate solutions, especially the purifying of sodium aluminate lyes obtained during the recovery of alumina according to the known processes without the necessity of previously decomposing the aluminate solution. It relates to a process comprising electrolyzing the solution by means of a cathode formed by stirred liquid mercury and of an anode made from a metal, which is insoluble under the conditions of the electrolysis, the terminal voltage (overall voltage) being at least 3 volts, the cathodic potential at least 1.6 volts and the current density at the cathode at least 0.35 ampere per dm.$^2$ (square decimeter). Preferably there is applied a terminal voltage of 3.8 to 4.2 volts, a cathodic potential of 1.9 to 2.2 volts and a current density at the cathode of 0.45 to 0.60 ampere per dm.$^2$.

A slow circulation of the mercury of the cathode does not render the process practicable. Rather strong stirring is required to act chiefly on the surface of the mercury without rupturing the continuity of said surface. In other words, one must avoid pulverizing the mercury with formation of droplets and also the creation of any gyratory motion causing an interruption of continuity at the surface of the cathode. On the other hand, if the stirring is not sufficiently strong, the purpose of the process is not attained. The variation in the number of revolutions of the stirrer from the single to the double or inversely may cause a variation in the yield (calculated on the basis of the gallium deposit) from one to ten or inversely. Without stirring the gallium deposit is insignificant.

The anode can be made of nickel which is particularly advantageous because of its low oxygen supertension.

During the electrolysis carried out under the conditions prescribed by the invention, the iron compounds precipitate together with the compounds of vanadium and probably also with those of other elements, such as chromium, and can be easily separated from the aluminate lye, for instance, by decantation followed by filtering or centrifuging. In this way, it is possible to eliminate substantially all the iron from the aluminate lye and to obtain an alumina substantially iron free. As to the precipitated vanadium compounds, they have an important market value for the following reasons: The vanadium content of the precipitate is very high, much higher than that of the residual salts obtained during the concentration of the aluminate lyes after precipitation of the hydrate of alumina; and they are substantially free from phosphorus. It follows that the purification process according to my invention may also be considered as a process of recovering vanadium compounds. Moreover, the precipitation of the vanadium compounds does not lead to losses of caustic soda, as is the case during the recovery of the vanadium compounds from the residual salts. However, the aluminate lye, which remains nearly saturated with vanadium during the usual cycle of operations, is freed from this element in the course of the purification electrolysis which is the subject of my invention. Therefore, the aluminate lye is capable of dissolving a much larger quantity of vanadium than the usual lye during a new attack of the bauxite; it affords an increase in the production of vanadium compounds, 2 to 3 times.

During the electrolysis, a little part of the silicon content becomes also eliminated. One finds metallic silicon in the mercury.

The gallium is deposited in metallic state at the cathode. The deposit in question is probably a dispersion of gallium in the mercury, but does not form an amalgam with the mercury. The gallium may be extracted from the mercury which is returned into the cycle of electrolytic purification. The easiest way to extract the gallium from the mercury is to treat the latter with a solution of a caustic alkali, for instance of caustic soda, to obtain an alkali gallate. The dissolution is favored by the presence of iron pieces dipped into the mercury. The solution of sodium gallate obtained in this way can be submitted to an electrolysis in order to obtain metallic gallium in the free state according to the known process which is described for instance in the French Patent No. 964,009 and in the book "Das Gallium" by E. Einicke, published 1937 by Leopold Voss in Leipzig (Germany) and reprinted by Edward Brothers Inc. at Ann Arbor, Michigan, in the year 1944, pages 52 to 54. It follows that the purification process according to my invention is also a process for recovering metallic gallium from the aluminate lyes or represents the first step of a combined process for the recovering of metallic gallium in the free state. For that reason, the process according to my invention is much more advantageous than the known processes for extracting gallium oxide from the sodium aluminate lyes, As a matter of fact, the known processes involve first of all a partial or total alteration of the aluminate lye. For instance, according to one of the known methods, firstly a part of the alumina (as hydrate) is precipitated and thereafter alumina and gallium oxide (as hydroxide) are precipitated simultaneously by treatment with carbon dioxide; again the obtained precipitate is dissolved in caustic soda, if necessary after heating to 350–600° C., in order to destroy the organic substances; finally, the solution is electrolyzed in order to deposit metallic gallium. In accordance with another method, a great part of the aluminate is firstly precipitated as calcium aluminate; thereafter the remaining lye is treated with carbon dioxide as in the process above.

According to a more recent method, the sodium aluminate lye is treated by hydrofluoric acid, which leads to the precipitation of the largest part of the alumina as cryolite, 70 to 80% of the gallium remaining in the solution.

In all the known methods, the extraction of the gallium oxide or hydroxide necessitates operations which interfere with the normal sequence of operations during the recovery of alumina according to the known processes. On the other hand, all these known methods involve the destruction of aluminate lye, which therefore can not be returned without further treatment into the cycle of operations. On the contrary, the process according to my invention makes possible the purification of the aluminate lyes without destroying or altering the same.

It is also possible to apply my process to aluminate lyes after decomposition, that is to say after precipitating the hydrate of alumina. The process may be applied indifferently to aluminate lyes of any concentration. Theoretical considerations lead to the conclusion that the yield decreases at very high concentrations, but in practice no noticeable decrease could be detected.

An apparatus for carrying out a process in accordance with the present invention is shown in the accompanying drawings. In these drawings, Fig. 1 is a diagrammatic vertical section taken on lines 1—1 of Fig. 2, through an electrolytic apparatus for carrying out a process in accordance with the present invention;

Fig. 3 is a side view with parts broken away of the anode assembly forming part of the electrolytic apparatus of Fig. 1 but shown on a larger scale; and Fig. 4 is a transverse section of the anode assembly of Fig. 3.

The following examples for carrying out the process according to my invention does not restrict its scope.

*1st example.*—4 litres of an undecomposed sodium aluminate lye obtained from a plant applying the Bayer process for recovering alumina from red bauxite are introduced into a cylindrical vessel made from Pyrex-glass and having a flat bottom of 16 cm. diameter covered with liquid mercury which forms a cathode having a surface of 2 dm.² The sodium aluminate lye, the temperature of which is 50° C., is submitted to electrolysis, a plate of pure nickel vertically suspended with a total submerged surface of 5 cm.² being employed as an anode. The terminal voltage varies between 3.8 and 3.9 volts; it is regulated in such a manner that the current density at the cathode is 0.45 ampere per dm.², which corresponds to an intensity of 0.9 ampere. The cathodic potential measured during the electrolysis is 1.9 volts compared with the hydrogen electrode. The mercury cathode is stirred by means of a glass agitator having the form of an inverted T, the horizontal part of which sweeps the whole mercury surface and dips 2 to 3 mm. (height) into the same. The speed of the stirrer is two revolutions per second.

Figure 1:
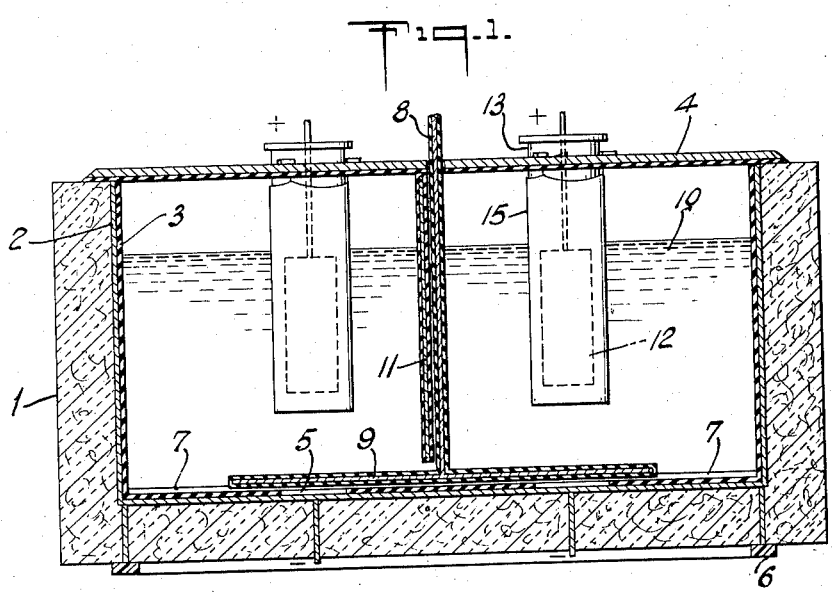
Figure 2:
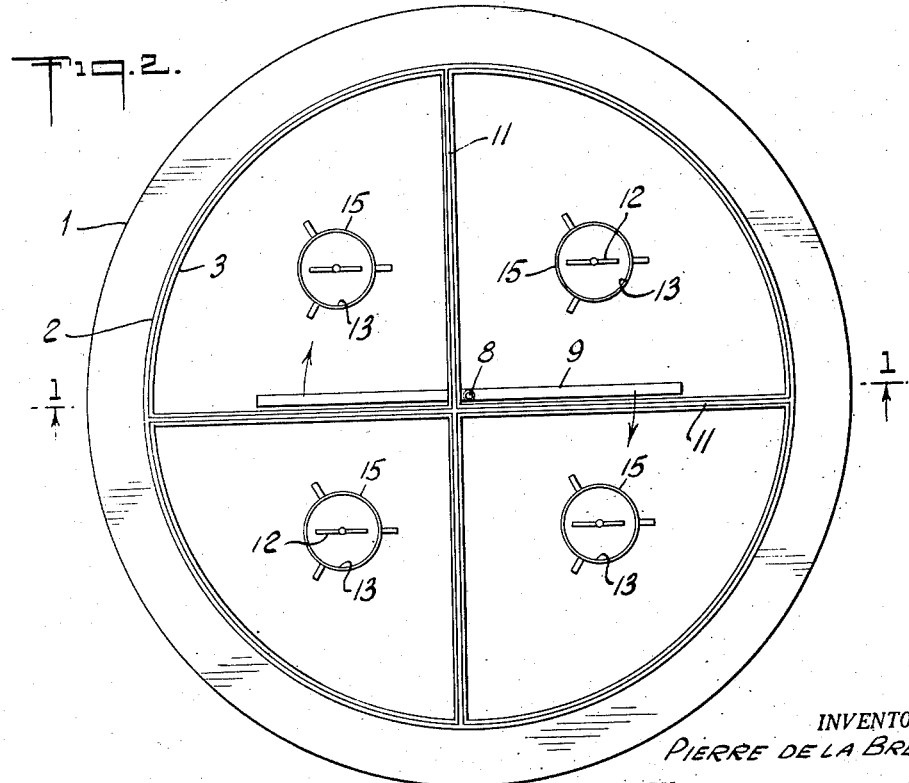
Fig. 2 is a top plan view of the electrolytic apparatus of Fig. 1, but shown with the cover removed.

The apparatus which may be employed to carry out the process of the 1st example, may be similar to that illustrated in Figs. 1–4, which will be described in connection with the 3rd example.

The aluminate lye used contains 140 grams $Na_2O$ total and 110 grams $Al_2O_3$ in one litre, and further:

| | | Before treatment | After 12 hours' electrolysis |
|---|---|---|---|
| $Na_2CO_3$ | grams/litre | 10.6 | 10.6 |
| $SiO_2$ | do | 0.59 | 0.44 |
| $V_2O_5$ | do | 0.53 | 0 |
| $Cr_2O_3$ | do | 0.078 | 0 |
| $Fe_2O_3$ | do | 0.0185 | 0 |
| $P_2O_5$ | do | 0.48 | 0.44 |
| Organic substances | do | 1.60 | 1.50 |
| Ga | do | 0.169 | 0.045 |

After 12 hours, electrolysis, the current consumption is 10 watt-hours per litre of lye.

The iron compound precipitates, as well as those of vanadium, may be removed from the aluminate lye, as for example, by decantation, followed by filtering or centrifuging. The gallium may be extracted from the mercury by treating the latter with a solution of caustic soda and then treating by electrolyzing as described hereinbefore.

*2nd example.*—4 litres of an aluminate lye obtained from the decomposers of a plant applying the Bayer process for recovering alumina from red bauxite are introduced into the apparatus described in the first example and submitted to electrolysis under the same conditions.

The used aluminate lye contains 140 grams $Na_2O$ total and 50 grams $Al_2O_3$ in one litre and further:

| | | Before treatment | After 12 hours' electrolysis | After 24 hours' electrolysis |
|---|---|---|---|---|
| $Na_2CO_3$ | grams/litre | 13.8 | 13.8 | 13.8 |
| $SiO_2$ | do | 0.61 | 0.52 | 0.48 |
| $V_2O_5$ | do | 0.57 | 0 | 0 |
| $Cr_2O_3$ | do | 0.078 | 0 | 0 |
| $Fe_2O_3$ | do | 0.0088 | 0 | 0 |
| $P_2O_5$ | do | 0.56 | 0.52 | 0.52 |
| Organic substances | do | 1.60 | 1.50 | 1.50 |
| Ga | do | 0.214 | 0.120 | 0.025 |

After 12 hours' electrolysis, the current consumption is 10 watt-hours and after 24 hours, 20 watt-hours per litre of lye.

These examples shown that the iron, the vanadium, the chromium and the gallium contents diminish most considerably.

The industrial electrolysis may be carried out for example in sheet iron vessels coated with a suitable artificial resin. The mercury may be stirred by means of usual mechanical agitators, but it is also possible to apply physical methods, as for instance, ultrasonic waves.

*3rd example.*—Referring to the drawings of an apparatus for carrying out the process industrially, 450 litres of an undecomposed sodium aluminate lye obtained from a plant applying the Bayer process for recovering alumina from red bauxite are introduced into a cylindrical vessel 1 made from 10 mm. thick steel sheet 2 by welding and provided inside with a 4 mm. thick coating 3 of ebonite. On the bottom of the vessel 1, four round spots 5 of 15 cm. diameter are left uncoated for the cathodic current supply. The vessel 1 is heat-insulated and in addition is electrically insulated by means of a 10 mm. thick ring 6 of plastic material (Bakelite) on which it rests. The bottom of the vessel 1 can be adjusted horizontally by means of 3 adjusting screws (not shown). The vessel 1 is closed with a cover 4 made of iron sheet and provided with an ebonite coating. Near the bottom, there is an outlet cock (not shown) for the mercury.

The vessel is 0.60 m. high and has an inner diameter of 1.13 m., so that the cathodic surface formed by a layer 7 of about 10 litres' mercury covering the bottom of the vessel is 1 m.². The height of the mercury layer is 1 cm.

The vessel 1 is provided with an agitator 8 having the form of an inverted T made from 1 cm. thick iron rod covered with rubber. In order to reduce the mercury losses due to pulverization, the arms 9 of the agitator have only a length of 40 cm. each; they dip by 2 to 3 mm. (height) into the mercury layer and the speed is 30 revolutions per minute. To avoid the lye 10 from being carried along by the agitator 8 and from rotating therewith, two vertical partition walls 11 made from sheet iron and covered with ebonite are disposed crosswise in the vessel 1. The lower ends of these walls 11 are about 5 cm. above the bottom mercury surface.

Each of the four compartments formed in the vessel 1 by the partition walls 11 is provided with an anode 12 made from annealed sheet nickel 100 mm. wide, 250 mm. long and 1 mm. thick. These anodes are welded to 5 mm. thick nickel rods for the current supply. Each anode is surrounded by a hollow cylinder 13 made from synthetic resin and having an inner diameter of 12.5 cm., as shown. The cylinder 13 is suspended in any conventional way, e. g. as shown in the figures. This hollow cylinder 13 is provided with 8–10 horizontal rows of round holes 14 of 20 mm. diameter forming 10–12 vertical rows. The hollow cylinder 13 are 50 cm. long and each is introduced into a sack 15 made from synthetic resin woven pervious cloth sold under the trade name Rilsan (Rilsan is a polyamide plastic). Of course, other plastics (synthetic resins) or other materials can be used instead of Rilsan for making the pervious diaphragm. The hollow cylinders 13 have no bottom but are closed at the lower end by the plastic sack 15. The lower end of each anode 12 is about 20 cm. over the bottom of the vessel 1. The total anodic surface is nearly 18 dm$^2$.

If necessary, the aluminate lye 10 is heated before being introduced into the electrolysis vessel 1 by means of steam passing through a jacket surrounding the supply pipe or in any other way. The temperature during the purification electrolysis should be 50° C.±2° C. As the duration of the purification electrolysis lasts many hours, the aluminate lye would noticeably cool, although the vessel 1 is heat insulated and provided with a cover. It is therefore necessary to supply heat to the aluminate lye during the electrolysis. In the present example, this is done by means of an electric immersion heater surrounded by a protecting tube made from Pyrex- glass (not shown). The power of this heater is 1300 watts. Of course, this heater must not be in operation all the time during the electrolysis; during a period of 11 hours it is about 4 hours in operation.

A terminal voltage of 4 volts is applied. The anodic current density is about 3 amperes per dm.$^2$. The cathodic potential is maintained between 1.9 and 2.2 volts compared with the hydrogen electrode and the current density at the cathode between 0.45 to 0.60 ampere per dm.$^2$. The duration of the electrolysis is 18 hours; the electrolysis current consumption during these 18 hours is 4000 watt-hours, the electrolysis current consumption being therefore about 8.8 watt-hours per litre. The aluminate lye used contains 140 grams of $Na_2O$ total and 110 grams of $Al_2O_3$ in one litre and further:

|  | Before treatment | After 6 hours' electrolysis | After 12 hours | After 18 hours | After 24 hours |
|---|---|---|---|---|---|
| $Na_2CO_3$ _____g/litre__ | 12.7 | 12.7 | 12.7 | 12.7 | 12.7 |
| $SiO_2$ _____do____ | 0.580 | 0.560 | 0.540 | 0.528 | 0.500 |
| $V_2O_5$ _____do____ | 0.67 | 0.08 | 0 | 0 | 0 |
| $Cr_2O_3$ _____do____ | 0.056 | 0 | 0 | 0 | 0 |
| $Fe_2O_3$ _____do____ | 0.018 | 0 | 0 | 0 | 0 |
| $P_2O_5$ _____do____ | 0.6 | 0.6 | 0.6 | 0.6 | 0.6 |
| Organic substances__do____ | 1.54 | 1.54 | 1.54 | 1.54 | 1.54 |
| Ga _____do____ | 0.145 | 0.129 | 0.093 | 0.061 | 0.034 |

0 gram/litre means for $V_2O_5$ less than 0.01 gram/litre, for $Cr_2O_3$ less than 0.005 gram/litre and for $Fe_2O_3$ less than 0.001 gram/litre.

If the terminal voltage is lower than 3 volts, the yield of the operation becomes insignificant. The optimum lies between 3.8 and 4.2 volts. A tension over 4.2 volts causes an increase in consumption of current without an equivalent increase of the yield.

One may regulate the terminal voltage by varying the anodic surface, the cathodic current density remaining constant. However, I have found that it is very advantageous to use a diaphragm 15 for instance of plastic cloth surrounding the anode; this allows the anodic surface to be increased at will and therefore the current density to be decreased. The diaphragm 15 hinders the diffusion of the anodic liquid and therefore the reoxidation of the precipitate. It does not cause any noticeable increase of the bath tension (that is to say of the resistance of the bath).

If the cathodic potential is lower than 1.6 volts, the gallium is not deposited and only a little part of the vanadium compounds is precipitated. A cathodic potential of about 1.9 to 2.2 volts insures the deposit of gallium and the total precipitation of the vanadium compounds. The cathodic potential is regulated automatically if one takes care to maintain the prescribed current density at the cathode.

On the laboratory scale, the best yield is obtained between 40 to 60° C. It is generally the temperature of the Bayer aluminate lyes before or after decomposition. On the industrial scale, I have found that the optimum temperature is 50° C.± 2° C. I have found that on the industrial scale, the yield decreases considerably if the temperature drops. At 37° C., the yield is by 50% smaller than at 50° C.

The deposit of gallium is rather proportional to the duration of the electrolysis. By prolonging the duration, one may recover substantially all of this element. However, under the conditions mentioned in the examples, the compounds of vanadium and chromium are totally eliminated from the aluminate lye already after 4 or 5 hours, and as the diminution of the iron content is fast, it may be preferable to interrupt the electrolysis in the laboratory scale after about 5 hours, as the vanadium is then wholly eliminated. The gallium which is not deposited will remain soluble in the aluminate lye, which is subjected to a new purification electrolysis in the subsequent cycle of operations, and will therefore not be lost. However, the duration of the purification electrolysis will vary according to the volume of the aluminate lye and its concentration. On the industrial scale, it will be preferable to extend the duration of the electrolysis to about 18 to 24 hours in order to diminish the number of operations of draining, washing, filling up and so on.

The electrolysis can be carried out not only in batches, but also continuously. In the latter case, the aluminate lye circulates for instance in a channel provided with electrolysis and stirring devices.

What is claimed is:

1. A process of purifying an alkali aluminate solution, which comprises electrolyzing the alkali aluminate solution by the action of a cathode of liquid mercury and an anode of a metal insoluble under the conditions of the electrolysis.

2. A process of purifying an alkali aluminate solution as described in claim 1, wherein the liquid mercury cathode is stirred during the electrolyzing step.

3. A process of purifying an alkali aluminate solution as described in claim 1, wherein the terminal voltage for the electrolysis step is at least 3 volts, the cathodic potential is at least 1.6 volts, and the current density at the cathode is at least 0.35 ampere per square decimeter.

4. A process of purifying an alkali aluminate solution as described in claim 1, wherein the terminal voltage for the electrolytic step is 3.8 to 4.2 volts, the cathodic potential is 1.9 to 2.2 volts and the current density at the cathode is 0.45 to 0.60 ampere per square decimeter.

5. A process of purifying an alkali aluminate solution with simultaneous recovery of vanadium compounds, which comprises electrolyzing the alkali aluminate solution by the action of a cathode of liquid mercury and an anode of a metal insoluble under the conditions of the electrolysis to cause the canadium compounds to be separated as precipitate, and separating the precipitate from the alkali aluminate solution.

6. A process of purifying an alkali aluminate solution with recovery of vanadium compounds as described in claim 1, wherein the terminal voltage for the electrolysis step is at least 3 volts, the cathodic potential is at least 1.6 volts, and the current density at the cathode is at least 0.35 ampere per square decimeter.

7. A process of purifying a solution of an alkali aluminate solution with simultaneous recovery of metallic gallium and vanadium compounds comprising electrolyzing the said alkali aluminate solution by the action of a cathode of liquid mercury while stirring said mercury and of anode means made from a metal which is insoluble under the the conditions of the electrolysis, the terminal voltage being at least 3 volts, the cathodic potential being at least 1.6 volts and the current density at the cathode being at least 0.35 ampere per square decimeter.

8. The process as described in claim 7, wherein the electrolysis is carried out at a temperature between 40 and 60° C.

9. A process as described in claim 7, wherein each anode is surrounded by a pervious diaphragm.

10. A process as described in claim 7, wherein each anode is surrounded by pervious diaphragm of synthetic resin.

11. A process as described in claim 7, wherein the precipitate of vanadium compounds produced by the electrolyzing step is separated from the alkali aluminate solution by decantation followed by filtering.

12. A process as described in claim 7, wherein the precipitate of vanadium compounds produced by the electrolyzing step is separated from the alkali aluminate solution by decantation followed by centrifuging.

References Cited in the file of this patent
UNITED STATES PATENTS
1,200,025   Reed ------------------ Oct. 3, 1916